Dec. 10, 1968    J. RITTER ET AL    3,415,031
STRUCTURAL STEEL ELEMENT
Filed Oct. 12, 1965

INVENTORS:
JOSEF RITTER & WILHELM BOYER
BY Ernest F. Marmorek
ATTORNEY

United States Patent Office 3,415,031
Patented Dec. 10, 1968

3,415,031
STRUCTURAL STEEL ELEMENT
Josef Ritter and Wilhelm Boyer, Graz, Styria, Austria, assignors to AVI Alpenlaendische Veredelungs-Industrie Gesellschaft m.b.H., Graz, Styria, Austria, a corporation of Austria
Filed Oct. 12, 1965, Ser. No. 495,261
1 Claim. (Cl. 52—690)

ABSTRACT OF THE DISCLOSURE

A structural steel element, for use as a reinforcement in concrete, includes two or more parallel longitudinal bars and a series of cross-braces that extend at intervals between the bars; each bar has an axial rib on its external surface, and the ribs of the two bars are disposed opposite each other; and each cross-brace is welded to the bars at their ribs.

---

Figure 1:
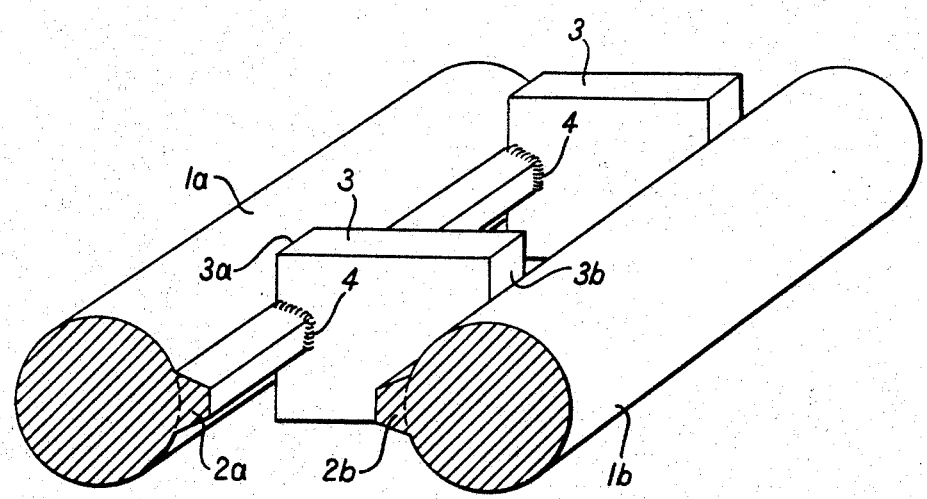

This invention relates to structural steel elements of a kind which are particuarly intended for the reinforcement of concrete, but are also used for other purposes and consist of two parallel longitudinal bars and cross braces welded to and extending between them at intervals.

In the structural elements of this kind which have usually been employed heretofore, cold-drawn round steel bars are used for the longitudinal bars, the round steel bars being welded to braces consisting of softer steel. It is true that good welded joints which fully meet requirements in the case of static loading are obtained in this way, but investigations have shown that as a result of the welding operations there is a certain effect on the round steel bars at the junction with the braces, owing to which the behaviour of these reinforcing elements is impaired in the case of dynamic loading.

The present invention is concerned with the problem of so improving reinforcing and other structural steel elements of the kind described at the beginning that they satisfy high demands even when dynamic loading, that is, for example, oscillatory loading, occurs.

It is accordingly among the principal objects of the invention to provide a structural steel element that avoids the drawbacks of the prior art and provides for good welding properties by specific shaping of the members of the element to withstand even dynamically applied stresses.

We find that this aim can be achieved if, in accordance with the invention the cross-braces are welded to longitudinal rib projections that are provided externally axially on the longitudinal bars.

With this arrangement the longitudinal bars are virtually unaffected by the welding operation in the region of their main cross-section since the zone of the effect of the welding is restricted to the projections, the longitudinal bars substantially retaining their original properties in their main cross-section.

The rib projections of the longitudinal bars may have a round, triangular, rectangular or trapezoidal cross-section, but if required may also have other cross-sectional forms. In order to facilitate the operation of drawing the profiled bars, it may be expedient to make the projections meet the surfaces of the longitudinal bars tangentially.

The outermost parts of the rib projections which face the braces are preferably narrower than the inner parts of the braces adjacent the longitudinal bars, that is the rib projections taper in an outward radial direction. This has the advantage that the welding current is concentrated at the location of each weld on a relatively narrow area of contact between the longitudinal bar and the brace, so that the welding is facilitated. The welding operation is preferably so conducted that the welded joint between the longitudinal bars and the braces is limited essentially to the region where the projections of the longitudinal bars are located.

Figure 1A:
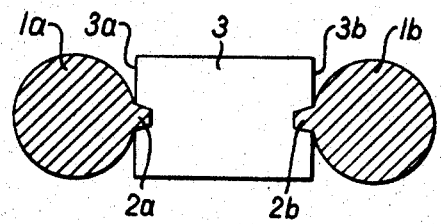
Figure 2:
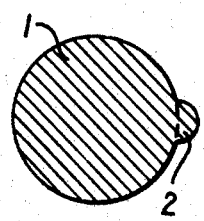
Figure 3:
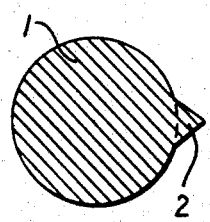
Figure 4:
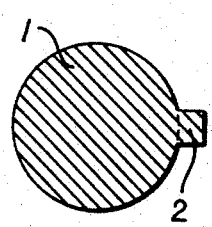
Figure 5:
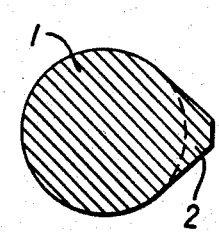

A number of examples of structural elements in accordance with the invention and components of such elements are illustrated in the accompanying drawings, in which:

FIGURES 1 and 1a show in perspective view and in cross-section, respectively, a short section of a reinforcing element in which there are two cross braces; and, FIGURES 2 to 5 are cross-sections through alternative longitudinal bars which can be employed.

In FIGURES 1 and 1a, the references 1a and 1b designate two longitudinal bars having continuous rib projections 2a, 2b of trapezoidal cross-section at the part of their surfaces which face one another. Welded in between the longitudinal bars 1a and 1b are cross braces 3 which have a substantially rectangular cross-section, with a slight convexity if required, and which are disposed edgewise with respect to the diametral plane through the longitudinal bars. As has been indicated by the welding seams 4, the welding of the braces 3 to the longitudinal bars 1a and 1b is confined essentially to the region of the projections 2a, 2b so that the circular main part of the cross-section of the longitudinal bars is virtually unaffected by the welding operation. End faces 3a, 3b of the braces 3 which receive the projections 2a, 2b are wider than the projections, so that these end faces first come into contact with the projections only locally in a limited surface region in which the heating is concentrated during the resistance welding, so that an intimate fusion or welding together takes place at this point.

The projections which extend along a generatrix at the surface zones of the longitudinal bars may have various forms. Thus, FIGURES 2, 3, 4 and 5 illustrate longitudinal bars 1 which have essentially a circular cross-section and comprise a round, or substantially triangular, or rectangular, or trapezoidal rib projection 2 respectively, extending along a narrow surface zone in the direction of a generatrix. In order to facilitate the drawing operation, the cross-section of the longitudinal bars 1 may be so chosen that the lateral surfaces of the projections 2 meet or join up with their cylindrical surface tangentially.

In addition to the reinforcing element illustrated, having only two parallel longitudinal bars, reinforcing elements with three, four or more longitudinal bars can also be produced by the longitudinal bars being welded to one another in pairs by means of braces in the manner described.

We claim:

1. A structural steel element, for use as a reinforcement in concrete, comprising at least two substantially parallel longitudinal round bars spaced apart from each other for a distance, a longitudinally extending rib projection on each longitudinal bar, said ribs facing each other across said distance, a series of cross-braces extending between said bars and being welded to said ribs on the bars, said cross-braces having substantially quadrangular shape and defining plane opposite end surfaces each disposed substantially tangentially of the periphery of a bar adjacent the rib thereof.

References Cited

UNITED STATES PATENTS

| 431,203 | 7/1890 | Dithridge | 52—690 |
|---|---|---|---|
| 1,620,362 | 3/1927 | Lachman | 52—694 |
| 1,676,824 | 7/1928 | Goodrich | 52—693 |
| 1,813,373 | 7/1931 | Wooldridge | 52—738 |
| 1,821,696 | 8/1931 | Edge | 52—738 |
| 2,916,910 | 12/1959 | Boyer et al. | 52—690 |

FRANCIS K. ZUGEL, Primary Examiner.